(12) United States Patent
Okada et al.

(10) Patent No.: US 8,301,862 B2
(45) Date of Patent: Oct. 30, 2012

(54) FORMATTING DEVICE

(75) Inventors: Takanori Okada, Osaka (JP); Toshihiro Tanaka, Hyogo (JP); Seiji Horita, Osaka (JP)

(73) Assignee: Panasonic Corporation, Osaka (JP)

( * ) Notice: Subject to any disclaimer, the term of this patent is extended or adjusted under 35 U.S.C. 154(b) by 451 days.

(21) Appl. No.: 12/601,864

(22) PCT Filed: May 22, 2008

(86) PCT No.: PCT/JP2008/001283
§ 371 (c)(1),
(2), (4) Date: Nov. 25, 2009

(87) PCT Pub. No.: WO2008/146473
PCT Pub. Date: Dec. 4, 2008

(65) Prior Publication Data
US 2010/0205396 A1     Aug. 12, 2010

(30) Foreign Application Priority Data
May 31, 2007   (JP) .................................. 2007-145948

(51) Int. Cl.
*G06F 12/02* (2006.01)
(52) U.S. Cl. ........................................................ 711/171
(58) Field of Classification Search .................. None
See application file for complete search history.

(56) References Cited

U.S. PATENT DOCUMENTS

| | | | |
|---|---|---|---|
| 6,591,356 B2 * | 7/2003 | McMurdie et al. | 711/206 |
| 6,810,441 B1 | 10/2004 | Habuto et al. | |
| 7,750,952 B2 | 7/2010 | Yoneda | |
| 2005/0276183 A1 | 12/2005 | Yoneda | |
| 2006/0292537 A1 * | 12/2006 | Nute et al. | 434/307 A |
| 2007/0043924 A1 * | 2/2007 | Ito et al. | 711/170 |

FOREIGN PATENT DOCUMENTS

| | | |
|---|---|---|
| JP | 2001-092704 | 4/2001 |
| JP | 2002-041341 | 2/2002 |
| JP | 2005-092677 | 4/2005 |
| JP | 2005-352765 | 12/2005 |
| JP | 2006-040168 | 2/2006 |
| JP | 2006-252096 | 9/2006 |

OTHER PUBLICATIONS

Utilitarian File System, Low JD, IBM Techincal Disclusure Bulletin, pp. 472-279, Apr. 2005.*
International Search Report issued Jun. 24, 2008 in International (PCT) Application No. PCT/JP2008/001283.

* cited by examiner

*Primary Examiner* — Duc Doan
(74) *Attorney, Agent, or Firm* — Wenderoth, Lind & Ponack, L.L.P.

(57) ABSTRACT

A formatting device (200) which formats a memory module in such a manner that delay in updating management information is prevented is a formatting device that formats a memory card (100) including a first recording area (110) and a second recording area (120) having different characteristics, the formatting device including: a use determination unit (210) configured to hold a ratio of recording areas to be allocated to each of directories that are to be created when the memory card (100) is formatted; and a management information generation unit (220) configured to allocate, to each directory, a recording area having a size determined for the directory according to the ratio held by the use determination unit (210), the recording area being included in the first recording area (110) of the memory card (100).

12 Claims, 7 Drawing Sheets

FORMATTING DEVICE

TECHNICAL FIELD

The present invention relates to a formatting device that formats an information recording medium (memory module) such as a memory card, and particularly to a formatting device and a formatting method for formatting a nonvolatile memory card which includes two types of recording areas having different characteristics.

BACKGROUND ART

In recent years, memory cards having a rewritable, nonvolatile memory medium are becoming widespread. With increased capacity of memory media and a higher recording and reproduction rate, memory cards have now begun to be used for recording video and audio with use of a camera recorder and so on that takes images. With the use of such memory cards, recording apparatuses such as camera recorders that record and reproduce video and audio require a fewer number of mechanically movable parts, which used to be the essential components in conventional tape media and disk media. As a result, it is possible to provide recording apparatuses that are small, light, and less subject to mechanical damage.

Video and audio data recorded on a memory card are generally managed as files by a file system. The file system manages the size of each file, the date and time of updating the record of each file, and the use status and the availability of recording areas such as clusters and sectors. The file system records such pieces of information on a recording medium as management information, together with video and audio files. During capturing of video and audio, the management information is frequently updated as the sizes of the video and audio files gradually increase. It is to be noted that the management information managed by the file system is described as file management information.

Updated data of the file management information is very small compared to the video and audio data recorded. In general, it is known that frequent update of small data in a nonvolatile memory medium such as a flash memory causes such problems as gradual shortening of the rewritable life of the memory medium, that is, reduction in the number of times rewrite is possible, and increased processing time required for updating small data.

In particular, as a result of recent increase in the capacity of flash memories and the like, the size of a collectively-deletable block tends to be larger. Further, when data recorded once is to be partially updated in a size smaller than the block size, the following processing is necessary: reading out the entire block including the part to be updated; replacing only the data of the updating part in the entire block; and writing back the entire block. As a result, the time required for updating the small data tends to increase as the block size expands.

In order to solve these problems, both Patent References 1 and 2, for example, disclose providing one memory card with two types of nonvolatile memory media (recording areas) having different characteristics, and recording file management information in one type of memory medium which is suitable for updating small data.

FIGS. 1A and 1B show an example of conventional formatting of a memory card including a first recording area and a second recording area having different characteristics, and an example of a conventional directory structure of such a memory card.

As shown in FIG. 1A, a memory card 700 includes a first recording area 710 and a second recording area 720. As for the first recording area 710, a memory medium or a memory control method suitable for updating small data is used. In other words, the first recording area 710 allows update of small data in a shorter time than the second recording area 720. The first recording area 710 and the second recording area 720 are assigned consecutive addresses. The first recording area 710 and the second recording area 720 can be seen as a single memory card from outside.

Next is a description of the case where a File Allocation Tables (FAT) file system, which is an example of the file system, manages data recorded on the memory card 700. It is to be noted that the file management information in the FAT file system is described in Patent Reference 3.

As shown in FIG. 1A, a FAT table 730, which is the file management information of the FAT file system, is placed in the first recording area 710. In the case of the FAT file system, the area of the memory card 700 in which files and directories are recorded is divided into many clusters 740, each of which is a unit for managing the recording areas. The clusters 740 are sequentially assigned a cluster number starting from 2.

FIG. 1B shows an example of a directory structure in the FAT file system. For example, as shown in FIG. 1B, a root directory 750 is at the top of the directory structure, and an AV directory 760 is below the root directory 750. A cluster having a cluster number 2 is allocated to the root directory 750, and a cluster having a cluster number 3 is allocated to the AV directory 760. Recorded in these clusters 740 are file management information such as directory entry information which are mainly related to a file stored in the directory and a lower directory.

In such a manner, according to the formatting of the memory card in the conventional example, the FAT table 730 and the directory entry information, which are the file management information of the FAT file system, are placed in the first recording area 710. Since the first recording area 710 is a memory medium suitable for updating small data, such file management information can be updated in a short time.

Further, Patent Reference 3 discloses calculating: the maximum number of files which can be created in the recording medium; and the number of clusters which can store the directory entry information corresponding to the maximum number of files, so as to reserve plural clusters in advance.

Patent Reference 1: Japanese Unexamined Patent Application Publication No. 2006-40168
Patent Reference 2: Japanese Unexamined Patent Application Publication No. 2005-92677
Patent Reference 3: Japanese Unexamined Patent Application Publication No. 2006-252096

DISCLOSURE OF INVENTION

Problems that Invention is to Solve

However, with the conventional memory card formatting, the file management information such as the directory entry information is likely to be written into the second recording area that is not suitable for updating small data, thereby causing a problem of delay in updating the file management information. That is to say, the conventional formatting device and formatting method have a problem of formatting memory cards in a manner that is likely to cause delay in updating the file management information.

Hereinafter, this problem is described in detail.

It is predicted that increase in the capacity of memory cards will allow the second recording area 720 shown in FIG. 1A, for example, to have a capacity of several gigabytes to several tens of gigabytes. Meanwhile, it is predicted that the first recording area 710 will be designed to have a capacity of several megabytes to several tens of megabytes because its characteristic memory medium and memory control are costly.

In such a case, when the number of files stored in the AV directory 760 significantly increases as a result of repeated shooting by a recording apparatus such as a video camera, the cluster having the cluster number 3, which has been the first to be allocated to the AV directory 760, can no longer store the directory entry information of the AV files. Consequently, addition of a new cluster becomes necessary for the AV directory.

Here, in the case where the clusters which are in the first recording area 710 and have cluster numbers 4 to 13 are already in use for other files or directories, a cluster which is in the second recording area 720 and has a cluster number 14, for example, is newly allocated to the AV directory 760. Since the second recording area 720 is not suitable for updating small data, there is a problem of increase in the time required for updating the directory entry information stored in the cluster which has been newly allocated to the AV directory 760.

More specifically, since the directory entry information is placed in the second recording area 720, the characteristics of the first recording area 710 that the time required for updating small data is short, for example, cannot be utilized, resulting in increase in the time required for updating the directory entry information. In particular, when a memory card is to be used for recording video and audio in real time, increase in the time required by the file system for updating the file management information creates a need for a large-capacity buffer memory because the recording data of video and audio is clogged during the delay in updating the file management information. Therefore, placing the file management information in the second recording area 720 is not preferred in such use.

When recording apparatuses such as video cameras capture video and audio, they sometimes record one video file and four audio files at a time, that is, a total of five files, in one capturing operation, for example. In other words, there is a case where recording apparatuses capture video and audio using multiple audio channels, and record independent audio files for each channel. In this case, storing a video file in a video directory and audio files in an audio directory allows easier management than in the case of storing the video file and the audio files in the same directory. Therefore, one would consider using plural directories including a video directory and an audio directory. The number of files created in the audio directory in one capturing operation is four times the number of files created in the video directory. Further, since the directory entry information is generated for every file, the data amount of the directory entry information generated in the audio directory also becomes four times the data amount of the directory entry information generated in the video directory.

Here, for example, one may consider using the method of Patent Reference 3 to reserve many clusters that are in the first recording area in advance, and allocate them to each directory. However, it is unclear how many clusters should be allocated to each of the plural directories such as the video directory and the audio directory. When the same number of clusters are simply allocated to each directory, repeated capturing causes a lack of clusters in the audio directory, even though some clusters of the video directory are still available. More specifically, since the data amount of the directory entry information generated in the audio directory is four times the data amount of the directory entry information generated in the video directory, the directory entry information of the audio directory cannot be recorded in the first recording area 710, thereby causing a problem that the directory entry information overflows into the second recording area 720.

In other words, in this case, the directory entry information of the audio file generated as a result of the capturing cannot be stored in the cluster of the audio directory and thus cannot be written in the first recording area 710. Consequently, the directory entry information is recorded in the second recording area 720. As a result, there is a problem of increased processing time for updating the directory entry information.

The present invention has been conceived in view of the above problems, and is characterized by providing a formatting device and a formatting method for formatting in such a manner that prevents delay in updating management information. More specifically, it is an object of the present invention to provide a formatting device and a formatting method for formatting in such a manner that management information such as directory entry information is reliably recorded in a first recording area which requires a shorter time for updating small data than a second recording area, in the case where an application of a recording apparatus and the like that records data on a memory card uses plural directories.

Means to Solve the Problems

In order to achieve the above object, the formatting device according to the present invention is a formatting device which formats a memory module including a first recording area and a second recording area having different characteristics, the formatting device including: a holding unit configured to hold a ratio of recording areas to be allocated to each of directories that are to be created when the memory module is formatted; and an allocation unit configured to allocate, to each directory, a recording area having a size determined for the directory according to the ratio held by the holding unit, the recording area being included in the first recording area of the memory module. For example, a time for updating data equal to or smaller than a predetermined size is shorter in the first recording area than in the second recording area. Further, the memory module is a memory card, for example.

With the memory card formatted by such a formatting device, a recording area, which is included in the first recording area and the size of which is determined according to a ratio held by the holding unit for each directory, is allocated to the directory. Thus, even when a recording apparatus repeatedly performs recording using the memory card, the management information can always be managed in the first recording area. Therefore, it is possible to reliably prevent delay in updating the data on the memory card, which is caused when the management information is recorded in the second recording area.

It is to be noted that the present invention can be realized not only as the above described formatting device, but also as a formatting method including the characteristic units of the formatting device as steps, and a program causing a computer to execute such steps. In addition, it is needless to say that such a program can be distributed via a recording medium such as a Compact Disk Read Only Memory (CD-ROM) and a transmission medium such as the Internet.

Effects of the Invention

According to the present invention, it is possible to reliably store management information of a file system in a first recording area. Thus, it becomes possible to make use of the characteristics of the memory medium having the first recording area and a method for controlling the first recording area. This leads to prevention of increase in the processing time required for updating small file management information in a FAT file system, for example.

Figure 1B:
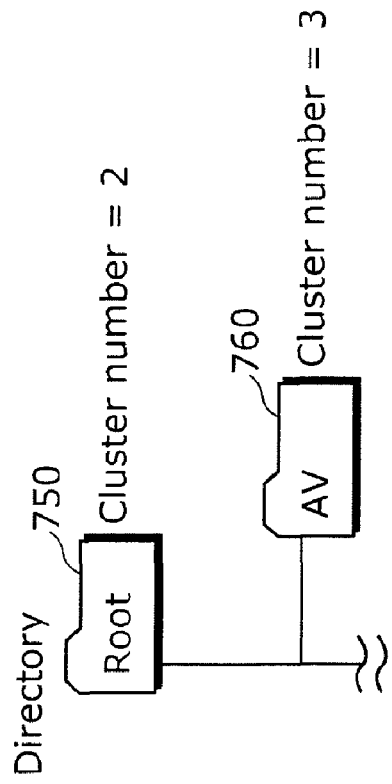
FIG. 1B shows a directory structure generated by conventional formatting of a memory card.
Figure 1A:
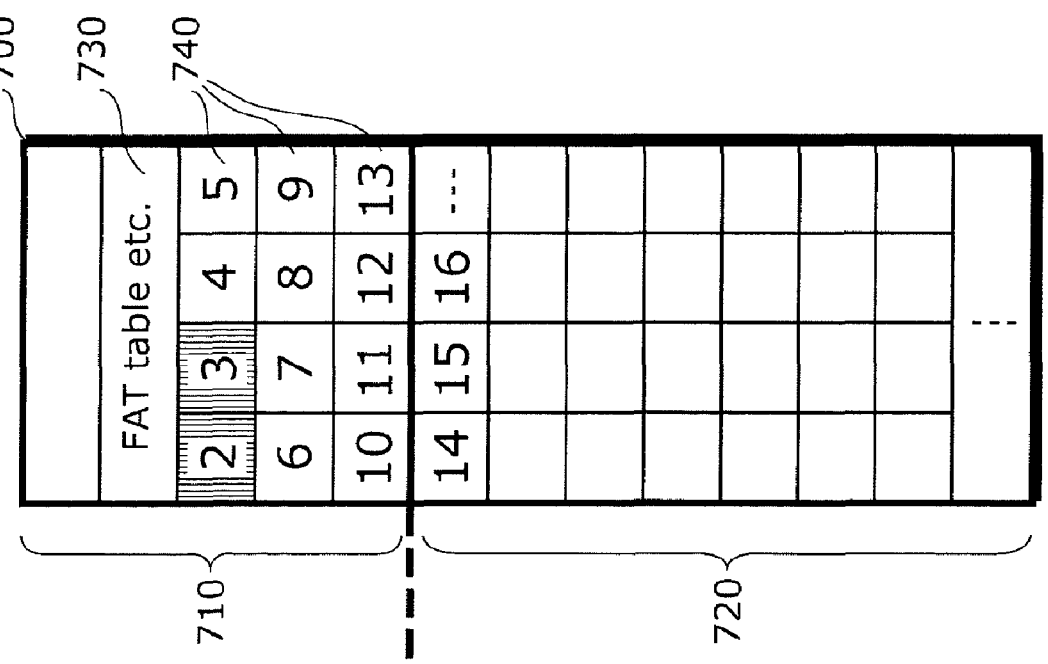
FIG. 1A shows conventional formatting of a memory card.

NUMERICAL REFERENCES 100, 400 Memory card
110, 410 First recording area
120, 420 Second recording area
130, 430 FAT table
140, 440 Cluster
150, 450 Root directory
160, 460 Video directory
170, 470 Audio directory
200, 600 Formatting device
210 Use determination unit
220 Management information generation unit
230 Card recording and reproduction unit
240 Parameter obtaining unit
250 Card interface unit
610 CPU
620 Bus unit
650 Card control unit

BEST MODE FOR CARRYING OUT THE INVENTION

Hereinafter, embodiments of the present invention are described with reference to the drawings.

(Embodiment 1)

A formatting device according to Embodiment 1 of the present invention is a device which formats such a memory card that internally includes at least a first recording area and a second recording area and that the first recording area requires a shorter time for updating data equal to or smaller than a predetermined size than the second recording area. The formatting device according to Embodiment 1 of the present invention is characterized in that, when formatting, it reserves clusters of the first recording area of the memory card (two and eight clusters in the present embodiment) according to a directory ratio (1:4 in the present embodiment) (a video directory and an audio directory in the present embodiment).

Figure 2A:
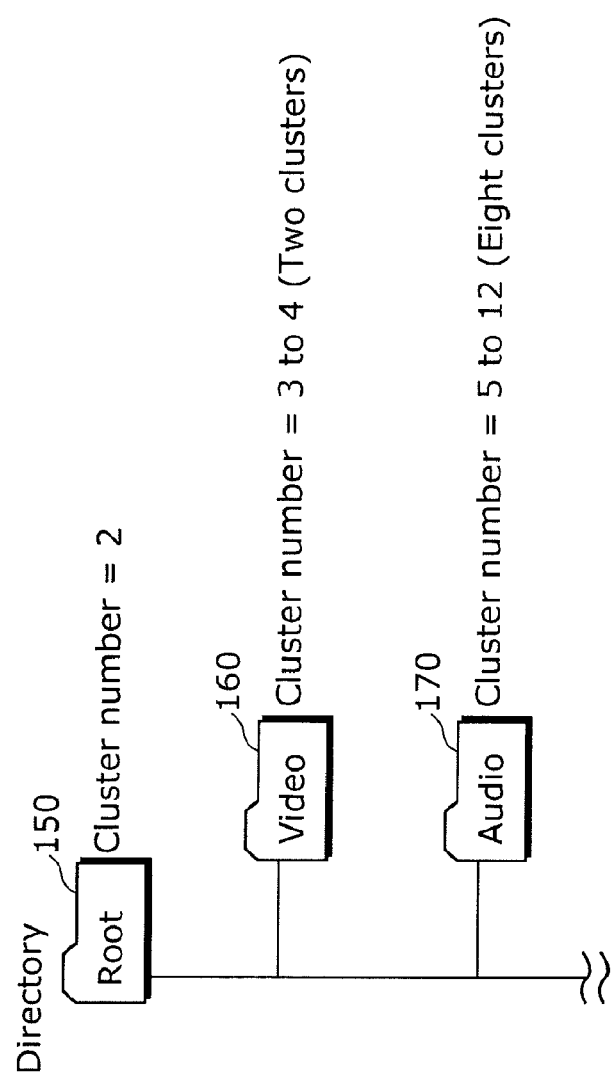
FIG. 2A shows a format of a memory card that is formatted according to Embodiment 1 of the present invention.
Figure 2B:
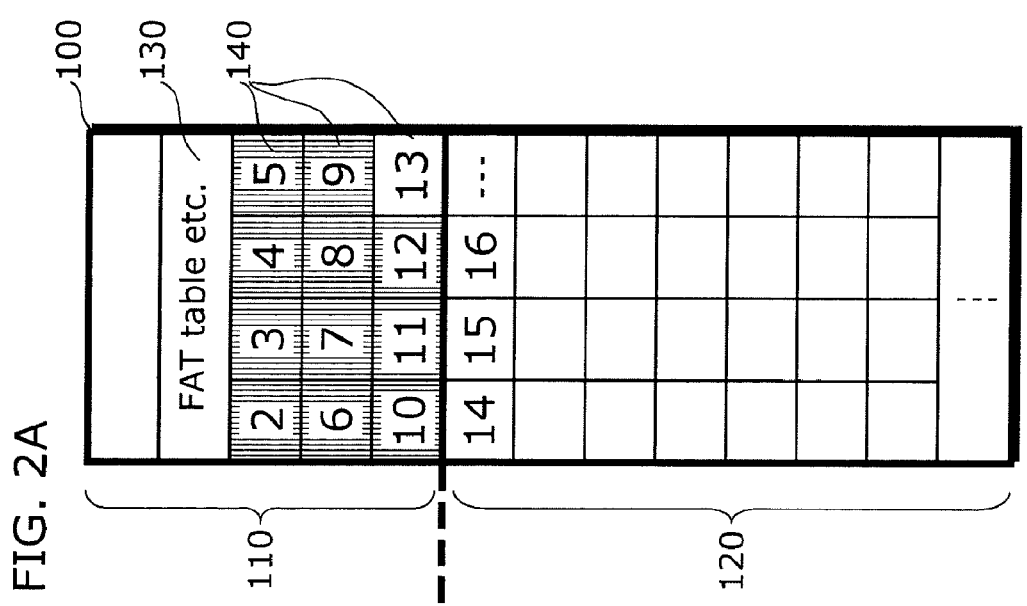
FIG. 2B shows a directory structure generated by formatting according to Embodiment 1 of the present invention.

FIGS. 2A and 2B show a format and a directory structure of a memory card that is formatted by the formatting device according to the present embodiment.

As shown in FIG. 2A, a memory card 100 includes a first recording area 110 and a second recording area 120. As for the first recording area 110, a memory medium suitable for updating small data is used. For example, the first recording area 110 is made up of blocks smaller than collectively-deletable blocks of the second recording area 120, which allows the first recording area 110 to update small data in a shorter time than the second recording area 120. The first recording area 110 and the second recording area 120 are assigned consecutive addresses. The first recording area 110 and the second recording area 120 can be seen as a single memory card from outside.

It is to be noted that a file system used in the present embodiment is a FAT file system (more specifically, a FAT 32 file system), for example. In the FAT file system, a FAT table, directory entry information, a partition boot record (PBR), FsInfo and so on are each treated as file management information. The file management information used in the FAT file system is equivalent to management information in a general file system.

A FAT table 130 is placed in the first recording area 110. Although not shown, a master boot record (MBR), a partition boot record (PBR), FsInfo which is the file management information of the FAT 32 file system are also placed in the first recording area 110 together with the FAT table 130. Each of the first recording area 110 and the second recording area 120 is divided into clusters 140, each of which is a unit for managing the recording areas of the FAT file system. The clusters 140 are sequentially assigned a cluster number starting from 2.

Further, as shown in FIG. 2B, the directory structure of the memory card 100 includes a root directory 150, a video directory 160, and an audio directory 170. Here, the video directory 160 and the audio directory 170 are located below the root directory 150.

A cluster having a cluster number 2 is allocated to the root directory 150; two clusters having cluster numbers 3 and 4 are allocated to the video directory 160; and eight clusters having cluster numbers 5 to 12 are allocated to the audio directory 170.

Here, a description is provided of the operation of a recording apparatus, such as a camera recorder, for recording data on a memory card that is formatted in the above manner. It is assumed here that the recording apparatus generates one video file and four audio files in one capturing operation.

Directory entry information, which is one type of the file management information of the video file, is stored in the video directory 160, whereas directory entry information of each of the four audio files is stored in the audio directory 170. As a result, as for the cluster allocated to the video directory 160, 32-byte directory entry information is used for each video file. Thirty-two bytes is the number of bytes of one piece of directory entry information in the FAT file system, and is the number of bytes in the case where the file is indicated with a file name having eight characters and with an extension having three characters. Since four audio files are generated, the cluster allocated to the audio directory 170 uses 32 bytes×4=128 bytes.

As the recording apparatus repeatedly performs capturing into the memory card 100, the clusters 140 allocated to each directory are used by the above mentioned number of bytes every time the capturing is performed. Given that the size of one cluster is 32 kilobytes, the allocation of two clusters to the video directory 160 means that the number of files which can be stored in the video directory is 32 kilobytes×2÷32 bytes=2048. However, the actual number of files which can be stored in the video directory 160 is 32 kilobytes×2÷32 bytes−2=2046. Because of a rule of the FAT file system, each directory excepting the root directory 150 includes two directory entries initially, one is an entry of itself and the other is an entry of its parent directory.

Further, since eight clusters are allocated to the audio directory 170, the number of files which can be stored in the audio directory is 32 kilobytes×8÷32 bytes−2=8190. When there are 2046 video files generated in the video directory 160, there are 2046×4=8184 audio files generated in the audio directory 170, that is, four times the number of files in the video directory 160. Since the above calculation shows that 8190 files can be stored in the audio directory 170, the number of audio files which can be stored is 8184.

That is to say, in the case where the memory card 100 is formatted using the formatting device of the present embodiment, even when the recording apparatus performs capturing 2046 times using the memory card 100, the directory entry information of the video directory and of the audio directory do not overflow the first recording area 110, but can be reliably stored in the clusters 140 of the first recording area 110. As aforementioned, the data amount of the directory entry information stored in the clusters of the first recording area 110 is 32 bytes per file, which is small compared to the amount of video and audio data. Therefore, since the small directory entry information is stored in the first recording area 110, the directory entry information can be updated in a short time.

On the other hand, the conventional formatting method (Patent Reference 3, for example) does not take into account the generation of plural files nor plural directories, thereby making it impossible to determine at what ratio the clusters of the first recording area should be allocated to the video directory and the audio directory. Suppose clusters are equally allocated to plural directories, then, among the twelve clusters 2 to 13 of the first recording area 110 shown in FIGS. 2A and 2B, the clusters excluding the cluster allocated to the root directory 150 and having the cluster number of 2, that is, eleven clusters 3 to 13 are equally allocated to the video directory 160 and the audio directory 170 by five clusters each.

As a result, the number of files which can be stored in the audio directory is 32 kilobytes×5÷32 bytes−2=5118 at maximum. The number of video files in this case is 5118÷4=1279.5, as it is a quarter of the number of audio files. Therefore, in the case of capturing into the memory card formatted according to the conventional formatting method, the maximum number of times the recording can be performed is 1279, and recording more than 1279 times causes the clusters of the second recording area to be allocated to the audio directory. This could result in increase in the time required for updating the directory entry information.

In contrast, the formatting method of the present invention allows 2046 times of capturing, which is approximately double the conventional number. This shows a significant improvement compared to the formatting method of the conventional example.

Next, the formatting device according to the present embodiment is described.

Figure 3:
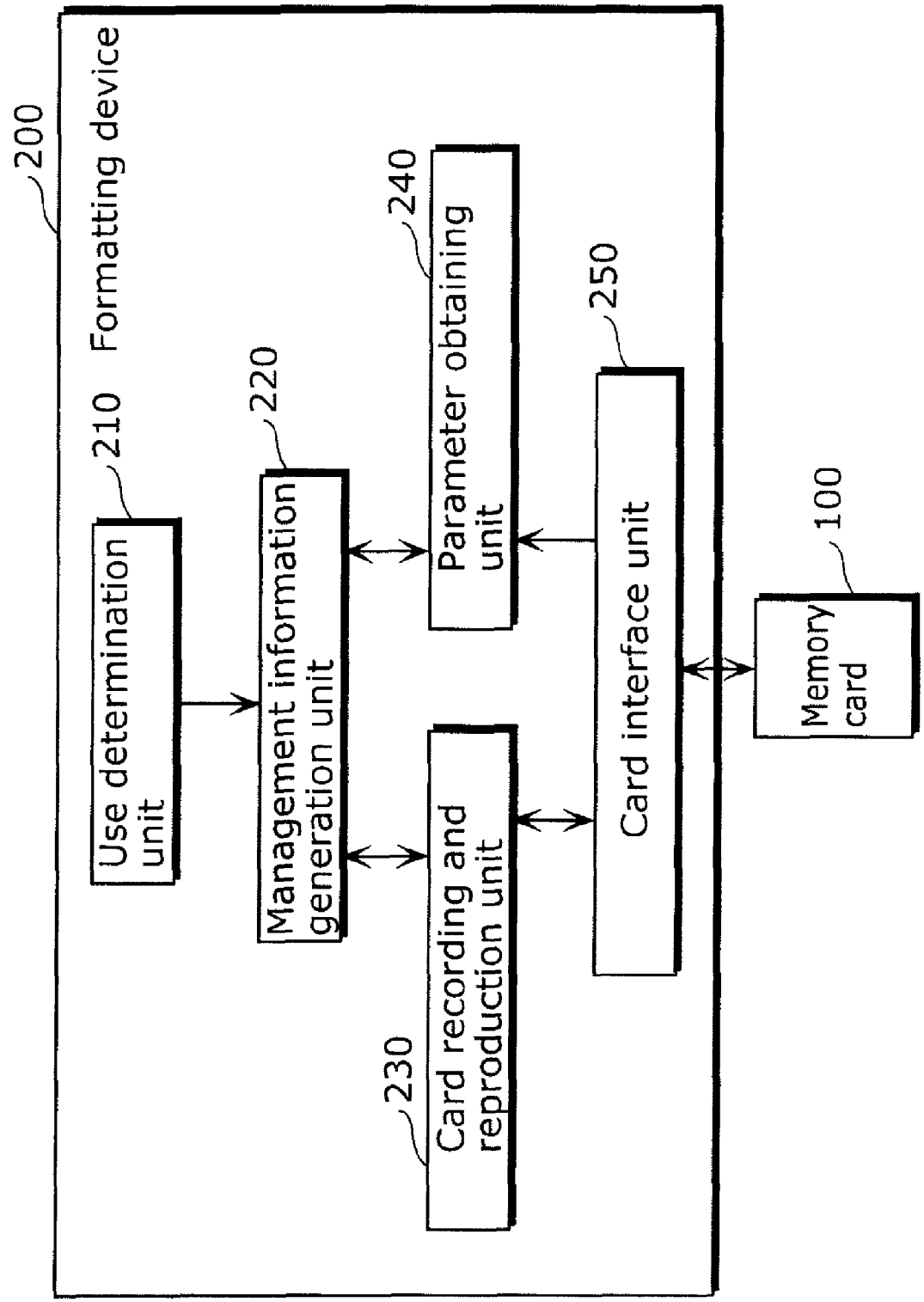
FIG. 3 is a functional block diagram of a formatting device according to Embodiment 1 of the present invention.

FIG. 3 is a functional block diagram of the formatting device according to the present embodiment.

As shown in FIG. 3, a formatting device 200 according to the present embodiment includes a use determination unit 210, a management information generation unit 220, a card recording and reproduction unit 230, a parameter obtaining unit 240, and a card interface unit 250. In the present embodiment, the use determination unit 210 has the functions of the holding unit, and the management information generation unit 220 has the functions of the allocation unit.

The use determination unit 210 holds use information indicating in which application (recording apparatus) the memory card 100 is to be used, and provides the use information to the management information generation unit 220. The use information indicates, for example, the type and the number of files to be recorded and the structure of a directory to be created. More specifically, the use information indicates a directory structure including, for instance, the video directory 160 and the audio directory 170, or a ratio of the number of clusters 140 to be allocated to the video directory 160 to the number of clusters 140 to be allocated to the audio directory 170 (1:4 in the present embodiment), for example.

It is to be noted that the use information may simply indicate a directory structure to be created at the time of formatting, and a ratio of the number of clusters to be allocated to each directory. Further, the ratio indicated by the use information as a ratio of the number of clusters to be allocated to each directory matches the ratio of the number of files to be generated in each directory by the recording apparatus.

The card interface unit 250 is connected to the memory card 100, and performs processing on the memory card 100 according to control by the card recording and reproduction unit 230 or the parameter obtaining unit 240.

The parameter obtaining unit 240 obtains, from the memory card 100 via the card interface unit 250, parameters necessary for formatting the memory card 100, and provides the parameters to the management information generation unit 220. For example, the parameters indicate the total capacity of the memory card 100, the size of the first recording area 110, the size of the second recording area 120, and address information of the two recording areas, for example. It is to be noted that the memory card 100 includes a means for providing such parameters.

Upon obtaining the file management information generated by the management information generation unit 220, the card recording and reproduction unit 230 writes the file management information on the memory card 100 via the card interface unit 250.

The management information generation unit 220 determines a partition starting position and a partition size of the memory card 100 based on the various parameters obtained from the parameter obtaining unit 240. After determining the partition size, the management information generation unit 220 determines the size and the number of FAT tables 130 based on a predetermined cluster size. It is to be noted that such determination regarding the partition and the FAT table 130 are performed in the same manner as the determination performed in a general formatting process.

In addition, the management information generation unit 220 calculates the number of clusters 140 in the first recording area 110 shown in FIG. 2A. To be more specific, the management information generation unit 220 calculates the remaining size of the first recording area 110 by subtracting: the size up to the partition starting position; the offset value up to the starting position of the FAT table 130; and a product of the size and the number of FAT tables 130, from the size of the first recording area 110 indicated by the parameter obtained from the memory card 100 via the parameter obtaining unit 240. Then, the management information generation unit 220 divides the remaining size by a predetermined cluster size to calculate the number of clusters 140 in the first recording area 110.

Furthermore, the management information generation unit 220 allocates the clusters 140 to each directory based on the use information provided by the use determination unit 210. More specifically, the management information generation unit 220 calculates, for each directory to be created, the number of clusters 140 to be allocated, by multiplying the aforementioned number of clusters 140 in the first recording area 110 by the directory ratio indicated by the use information.

For example, there are N clusters 140 in the first recording area 110, and the use information indicates "a:b:c:d . . . " as a ratio of the number of clusters to be allocated to each of directories A, B, C, D, that are to be created, except for the root directory 150. In such a case, the management information generation unit 220 calculates the integer portion of (N−1)÷(a+b+c+d+ . . . ) as a basic number M. Then, the management information generation unit 220 calculates: a×M as the number of clusters to be allocated to the directory A; b×M as the number of clusters to be allocated to the directory B; c×M as the number of clusters to be allocated to the directory C; and d×M as the number of clusters to be allocated to the directory D.

Specifically, in the case of performing the formatting as shown in FIGS. 2A and 2B, the management information generation unit 220 performs the calculation with N=12 as the number of clusters 140 in the first recording area 110. Further, the management information generation unit 220 determines, based on the use information, that the directories to be created are the video directory 160 (the directory A) and the audio directory 170 (the directory B), and that the ratio of the number of clusters 140 to be allocated to each directory is a:b=1:4. As a result, among N=12 clusters, the management information generation unit 220 allocates one cluster to the root directory 150, and calculates (12−1)÷(1+4)=2.2 as the basic number M (the integer portion M=2). Then, the management information generation unit 220 calculates a×M=1× 2=2 as the number of clusters to be allocated to the video directory 160, and calculates b×M=4×2=8 as the number of clusters to be allocated to the audio directory 170.

In such a manner, the management information generation unit 220 determines the number of clusters 140 to be allocated to each directory, and generates file management information such as the FAT table 130, the FsInfo, and the directory entry information according to the determination result. Then, the management information generation unit 220 provides the file management information to the card recording and reproduction unit 230.

Figure 4:
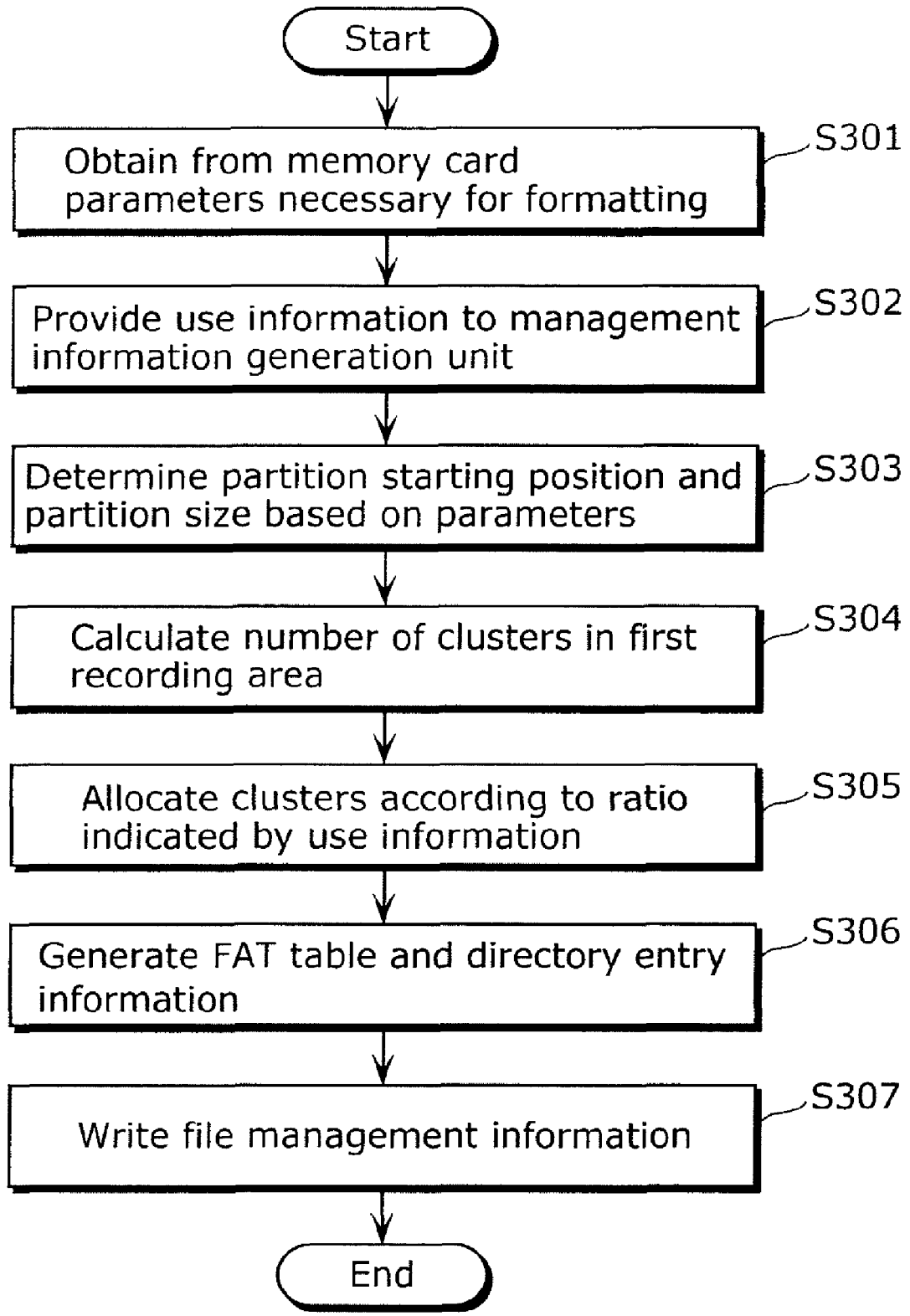
FIG. 4 is a flowchart showing an operational procedure of a formatting device according to Embodiment 1 of the present invention.

FIG. 4 is a flowchart showing an operational procedure of the formatting device 200 according to the present embodiment.

Initially, the parameter obtaining unit 240 obtains, from the memory card 100 via the card interface unit 250, parameters necessary for formatting (Step S301). Next, the use determination unit 210 provides use information to the management information generation unit 220 (Step S302). Then, the management information generation unit 220 determines a partition starting position and a partition size of the memory card 100 based on the various parameters obtained from the parameter obtaining unit 240 (Step S303).

Next, the management information generation unit 220 calculates the number of clusters 140 in the first recording area 110 based on the partition size and so on determined in Step S303 (Step S304). In addition, the management information generation unit 220 allocates the clusters 140 to each directory based on a ratio indicated by the use information provided by the use determination unit 210 (Step S305). After that, the management information generation unit 220 generates file management information such as the FAT table 130, the FsInfo, and the directory entry information, according to the number of clusters 140 allocated to each directory (Step S306).

Then, the management information generation unit 220 outputs the generated various file management information to the card recording and reproduction unit 230. Upon obtaining the file management information from the management information generation unit 220, the card recording and reproduction unit 230 writes the file management information on the memory card 100 via the card interface unit 250 (Step S307). By writing the file management information on the memory card 100 in this manner, the formatting of the memory card 100 is completed. As a result, the memory card 100 is formatted as shown in FIGS. 2A and 2B, and thus the advantageous effect of the present invention can be obtained.

It is to be noted that although the present embodiment has shown the case where one video file and four audio files are generated in one capturing operation by the recording apparatus, the present invention is not limited to this example, and the ratio of the number of files to be generated may be varied. For example, in the case where n video file(s) (where n is any given positive integer) and m audio file(s) (where m is any given positive integer) are generated in one capturing operation by the recording apparatus, the use information indicates "n:m" as the ratio of the number of clusters 140 to be allocated to the video directory 160 and the audio directory 170.

Further, although the present embodiment has shown the case where video files and audio files are generated by the capturing operation of the recording apparatus, different types of files may be generated. For example, it is acceptable to generate thumbnail files of still picture data indicating a representative picture of a captured video, or metafiles of metadata indicating various settings and statuses related to capturing. Even in such a case, appropriate clusters can be allocated to the directories storing such files as above, as long as the use information indicates a directory structure including the directories for storing such files and a ratio of the number of clusters to be allocated to each directory.

It is to be noted that for the settings of the capturing by the recording apparatus, there could be a case where the number of audio channels is changed to two or four, or a case where the generation of metafiles or thumbnail files is switched on/off at the time of capturing. In such cases, the number of files generated in one capturing operation changes depending on the settings made at the time of capturing. With the formatting device 200 according to the present embodiment, however, as long as the directory structure and the ratio of the number of clusters which are indicated by the use information and are to be applied at the time of formatting are set in advance in case of generating the largest number of files in one capturing operation, it is possible to allocate an appropriate number of clusters to each directory even in such cases as above where the number of files changes.

Further, the formatting device 200 of the present embodiment may have a multi-formatting function. For example, in the case where the number of audio channels is switched to two as described above, two audio files are generated for every video file. Thus, the formatting device 200 of the present embodiment allocates plural clusters in the first recording area 110 to the video directory 160 and the audio directory 170 at the ratio of 1:2. Whereas, in the case where the number of audio channels is switched to four, two audio files are generated for every video file. Thus, the formatting device 200 of the present embodiment allocates plural clusters present in the first recording area 110 to the video directory 160 and the audio directory 170 at the ratio of 1:4.

In this case, the use determination unit 210 holds use information indicating the ratio 1:2 and use information indicating the ratio 1:4. The formatting device 200 includes a selection unit which receives a user operation and selects, based on the received operation, use information from among the plural pieces of use information (ratios) held by the use determination unit 210. Then, the management information generation unit 220 allocates, to each directory, the clusters 140, the number of which is determined according to the ratio indicated by the use information selected by the selection unit.

Furthermore, there could be a case where the number of files to be generated by the recording apparatus is not determined. For example, with a camera recorder and so on which can repeatedly take still images while taking video, a great number of still-image files are generated in one capturing operation. Moreover, there could also be a case where a great number of files of memo information and edit information are generated by adding memo information and edit information to video and audio after the capturing. Such cases can be handled by allocating in advance the clusters to directories which are to store the files, at a ratio considered to be practically sufficient.

(Embodiment 2)

Next, a formatting device according to Embodiment 2 is described with reference to the drawings. The formatting device according to the present embodiment is characterized by, at the time of formatting a memory card, allocating in advance one cluster of the first recording area to each directory and preliminarily allocating plural clusters of the first recording area to the root directory. As a result, the recording apparatus can manage file management information using the preliminary clusters of the first recording area which have been allocated to the root directory in advance, in the case where repeated recording and so on has caused a lack of recording areas in the video directory or the audio directory. As a consequence, as with the formatting device of Embodiment 1, the formatting device of the present embodiment can reliably record, in the first recording area, the file management information such as the directory entry information without causing an overflow of the first recording area, and can prevent delay in updating the file management information.

It is to be noted that the directory to which a great number of clusters are preliminarily allocated is not limited to the root directory, and a directory having another name may be used.

Figure 5:
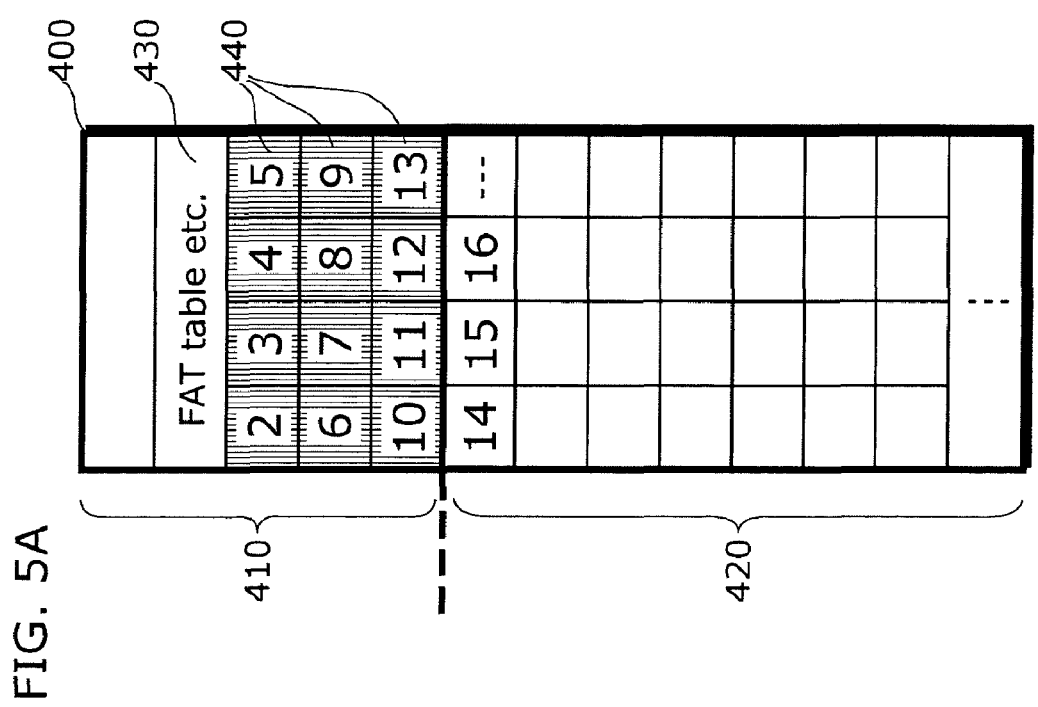
FIG. 5A shows a format of a memory card that is formatted according to Embodiment 2 of the present invention.
FIG. 5B shows a directory structure generated by formatting according to Embodiment 2 of the present invention.

FIGS. 5A and 5B show a format and a directory structure of a memory card that is formatted by the formatting device according to the present embodiment.

As shown in FIG. 5A, a memory card 400 includes a first recording area 410 and a second recording area 420. As for the first recording area 410, a memory medium suitable for updating small data is used. Each of the first recording area 410 and the second recording area 420 is divided into clusters 440, each of which is a unit for managing the recording areas of the FAT file system. Each cluster 440 is assigned a cluster number starting from 2. A FAT table 430 is placed in the first recording area 410.

Further, as shown in FIG. 5B, the directory structure of the memory card 400 includes a root directory 450, a video directory 460, and an audio directory 470. Here, the video directory 460 and the audio directory 470 are located below the root directory 450.

With the characteristic formatting of the present embodiment, plural clusters are allocated to the root directory 450 in advance as shown in FIGS. 5A and 5B. More specifically, a cluster 440 having a cluster number 2 and nine clusters 440 having cluster numbers 5 to 13 are allocated to the root directory 450. Meanwhile, only a single cluster 440 is allocated to each of the other directories. Specifically, a cluster 440 having a cluster number 3 is allocated to the video directory 460, and a cluster 440 having a cluster number 4 is allocated to the audio directory 470.

The following is a description of the number of files and the amount of data to be recorded by the recording apparatus on the memory card formatted in the above manner. It is to be noted that in the present embodiment as in Embodiment 1 described above, the recording apparatus such as a camera recorder is assumed to generate, at the time of capturing into the memory card 400, one video file and four audio files in one capturing operation.

As the recording apparatus such as a camera recorder repeatedly performs the capturing into the memory card 400, the clusters 440 allocated to each directory are used by the above mentioned number of bytes of the directory entry information (32 bytes) every time the capturing is performed. Given that the size of one cluster 440 is 32 kilobytes, the allocation of one cluster to the video directory 460 means that the number of files which can be stored in the video directory 460 is 32 kilobytes×1÷32 bytes=1024. However, the actual number of files which can be stored in the video directory 460 is 32 kilobytes×1÷32 bytes−2=1022, because the FAT file system separately uses, for each directory except for the root directory 450, file management information (directory entry information) which is equivalent to two files. Further, since one cluster 440 is also allocated to the audio directory 470, the actual number of files which can be stored in the audio directory 470 is also 1022.

With such an allocation status of the clusters 440, four audio files are generated every time the capturing is performed, resulting in that the cluster 440 allocated to the audio directory 470 becomes full at the $255.5^{th}$ time=1022÷4, that is, at the $255^{th}$ time of recording. Thus, in order to enable the $256^{th}$ time of capturing, a new cluster 440 needs to be allocated to the audio directory 470.

Here, the FAT file system, which processes the file management information for the recording apparatus such as a camera recorder that performs capturing into a memory card, is assumed to perform characteristic processing. The following is a description of the characteristic processing.

At the $256^{th}$ time of capturing, the FAT file system of the recording apparatus additionally allocates a new cluster to the audio directory 470. At this time, the FAT file system does not search for an available cluster in the second recording area 420 shown in FIG. 5A to newly allocate a cluster. Rather, the FAT file system reallocates, to the audio directory 470, one cluster 440 that is one of substantially available clusters which are among the plural clusters 440 preliminarily allocated to the root directory 450 (the clusters 440 having the cluster numbers 2 and 5 to 13) and in which no directory entry information is recorded.

What is recorded in the clusters 440 of the root directory 450 are only volume information defined by the FAT file system and the file management information of the video directory 460 and the audio directory 470 which are located below the root directory 450. The total size of the file management information including the volume information is several tens of bytes at the most. Therefore, among the plural clusters 440 allocated to the root directory 450 shown in FIG. 5A (the clusters 440 having the cluster numbers 2 and 5 to 13), the cluster 440 having the cluster number 2 is the only cluster that is substantially in use. Thus, out of the remaining clusters 440 having the cluster numbers 5 to 13, one cluster 440 can be reallocated to the audio directory 470. Through the reallocation of the cluster 440, the FAT table 430 and the file management information of each directory are updated, and the number of clusters 440 allocated to the root directory 450 decreases by one, whereas the number of clusters 440 allocated to the audio directory 470 increases by one.

With this processing, even when the recording apparatus performs the capturing for the $256^{th}$ time, the directory entry information of the audio directory 470 is stored in the newly added and allocated cluster 440. As a result, even when the new cluster 440 is allocated to the audio directory 470, this cluster 440 is located in the first recording area 410, and thus it is possible to prevent increase in the time required for updating the directory entry information.

As the recording apparatus repeatedly performs the capturing, the audio directory 470 and the video directory 460 again become full with the directory entry information. However, through the above-described reallocation of the cluster 440 performed by the FAT file system of the recording apparatus every time such a situation occurs, it is possible to increase the number of clusters 440 allocated to each directory, until the number of clusters 440 remaining in the root directory 450 becomes one.

Next, the formatting method according to the present embodiment is described. It is to be noted that the structure of the formatting device according to the present embodiment is basically the same as that of the formatting device 200 of Embodiment 1. Thus, the constituent elements of the formatting device and the formatting device of the present embodiment are given the same reference numerals as those of the constituent elements of the formatting device and the formatting device of Embodiment 1.

Figure 6:
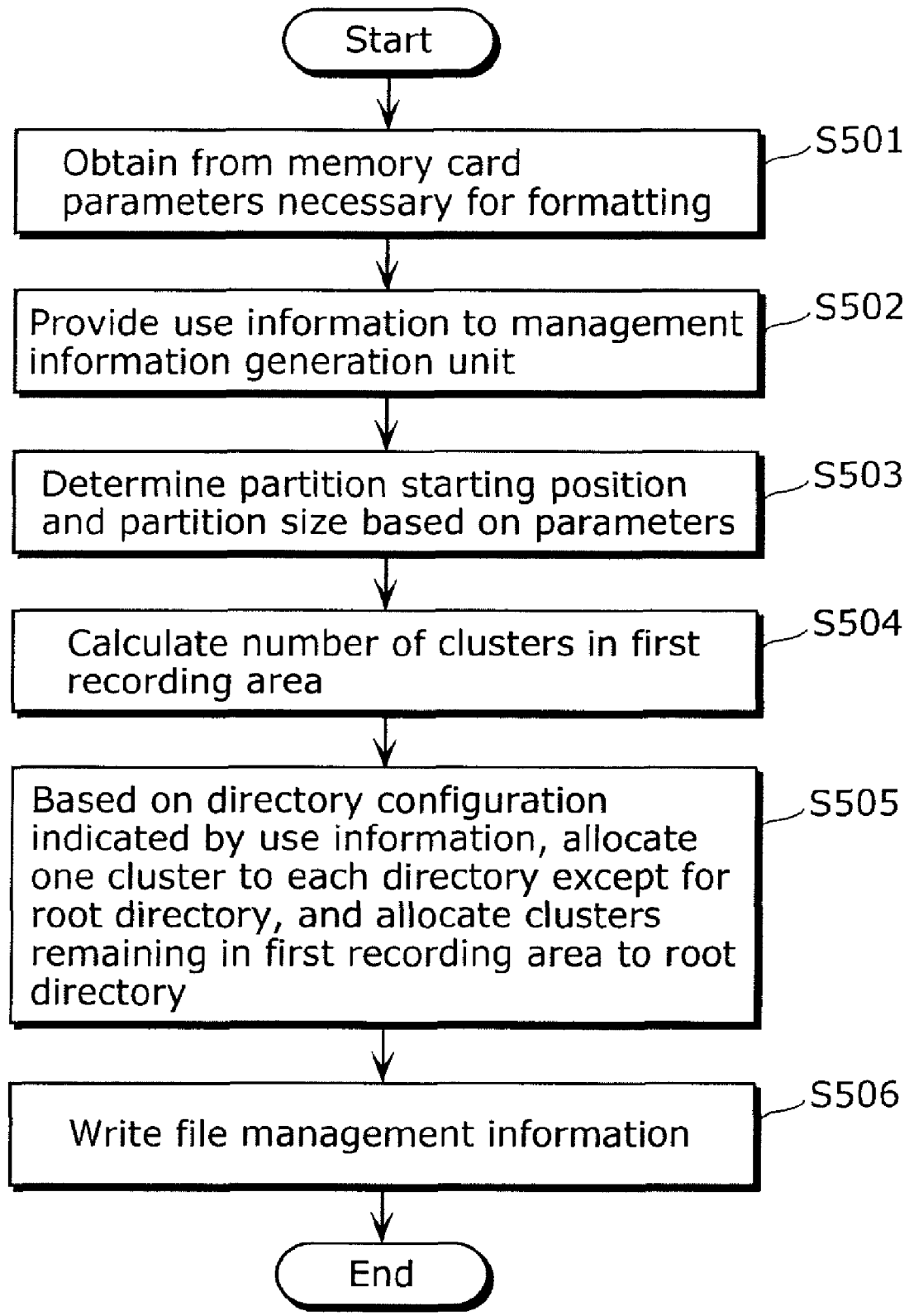
FIG. 6 is a flowchart showing an operational procedure of a formatting device according to Embodiment 2 of the present invention.

FIG. 6 is a flowchart showing an operational procedure of a formatting device 200 according to the present embodiment.

Initially, the parameter obtaining unit 240 obtains, from the memory card 400 via the card interface unit 250, parameters necessary for formatting (Step S501). For example, the parameters indicate the total capacity of the memory card 400, the size of the first recording area 410, the size of the second recording area 420, and address information of the two recording areas, for example. It is to be noted that the memory card 400 includes a means for providing such parameters.

Next, the use determination unit 210 provides, to the management information generation unit 220, use information indicating in which application (recording apparatus) the memory card 400 is to be used (Step S502). More specifically, it is sufficient, in the present embodiment, for the use information to indicate the directory structure to be created in the memory card 400. Unlike in Embodiment 1, it is not necessary to include information such as a ratio of the number of files to be created in each directory, that is, a ratio of the number of clusters to be allocated to each directory.

Then, the management information generation unit 220 determines a partition starting position and a partition size of the memory card 400 based on the various parameters obtained from the parameter obtaining unit 240 (Step S503). After determining the partition size, the management information generation unit 220 determines the size and the number of FAT tables 430 based on a predetermined cluster size. It is to be noted that such determination regarding the partition and the FAT table 430 are performed in the same manner as the determination performed in a general formatting process.

Here, the management information generation unit 220 calculates the number of clusters 440 in the first recording area 410 (Step S504). To be more specific, the management information generation unit 220 calculates the remaining size of the first recording area 410 by subtracting: the size up to the partition starting position; the offset value up to the starting position of the FAT table 430; and a product of the size and the number of FAT tables 430, from the size of the first recording area 410 obtained from the memory card 400 via the parameter obtaining unit 240. Then, the management information generation unit 220 divides the remaining size by a predetermined cluster size to calculate the number of clusters 440 in the first recording area 410.

Based on the directory structure indicated by the use information provided by the use determination unit 210, the management information generation unit 220 allocates one cluster 440 to each of the video directory 460 and the audio directory 470, and allocates all the clusters 440 remaining in the first recording area 410 to the root directory 450 (Step S505).

Lastly, the management information generation unit 220 generates file management information such as the FAT table 430, the FsInfo, and the directory entry information according to the number of clusters 440 allocated to each directory, and outputs the file management information to the card recording and reproduction unit 230. Upon obtaining the file management information from the management information generation unit 220, the card recording and reproduction unit 230 writes the file management information on the memory card 400 via the card interface unit 250 (Step S506). By writing the file management information on the memory card 400 in this manner, the formatting of the memory card 400 is completed.

Through the above-described processing, as shown in FIGS. 5A and 5B, the memory card 400 is formatted such that one cluster is allocated to the video directory 460 and the audio directory 470, and all the remaining clusters 440 in the first recording area 410 are allocated to the root directory 450.

Thus, when the recording apparatus having the function of reallocating the clusters 440 handles the memory card 400, even in a situation where a new recording area is required because the clusters 440 allocated to the video directory 460 and the audio directory 470 are all used up, the clusters 440 which have been preliminarily allocated to the root directory 450 can be reallocated to be newly added to the video directory 460 and the audio directory 470. As a result, it is possible to reliably prevent the file management information such as the directory entry information from being recorded in the second recording area 420 of the memory card 400.

It is to be noted that in the present embodiment, after allocating one cluster 440 to each directory, the clusters 440 remaining in the first recording area 410 are all allocated to the root directory 450. However, the remaining clusters 440 do not have to be allocated to the root directory 450, but may be allocated to the video directory 460 or the audio directory 470, for example. Alternatively, a directory or a file having another name may be created so as to allocate the remaining clusters 440 thereto.

Furthermore, after allocating one cluster 440 to each directory, the clusters 440 remaining in the first recording area 410 do not have to be allocated to the root directory 450, but may be treated as clusters which are being used on the FAT table. The clusters being used on the FAT table will not be used for other files and so on. Therefore, by making the remaining clusters 440 be used on the FAT table, the recording apparatus can perform the reallocation using such clusters 440 being used, when additional clusters 440 are required for each directory.

It is to be noted that the formatting method according to the present invention can be implemented by an apparatus such as a general personal computer.

Figure 7:
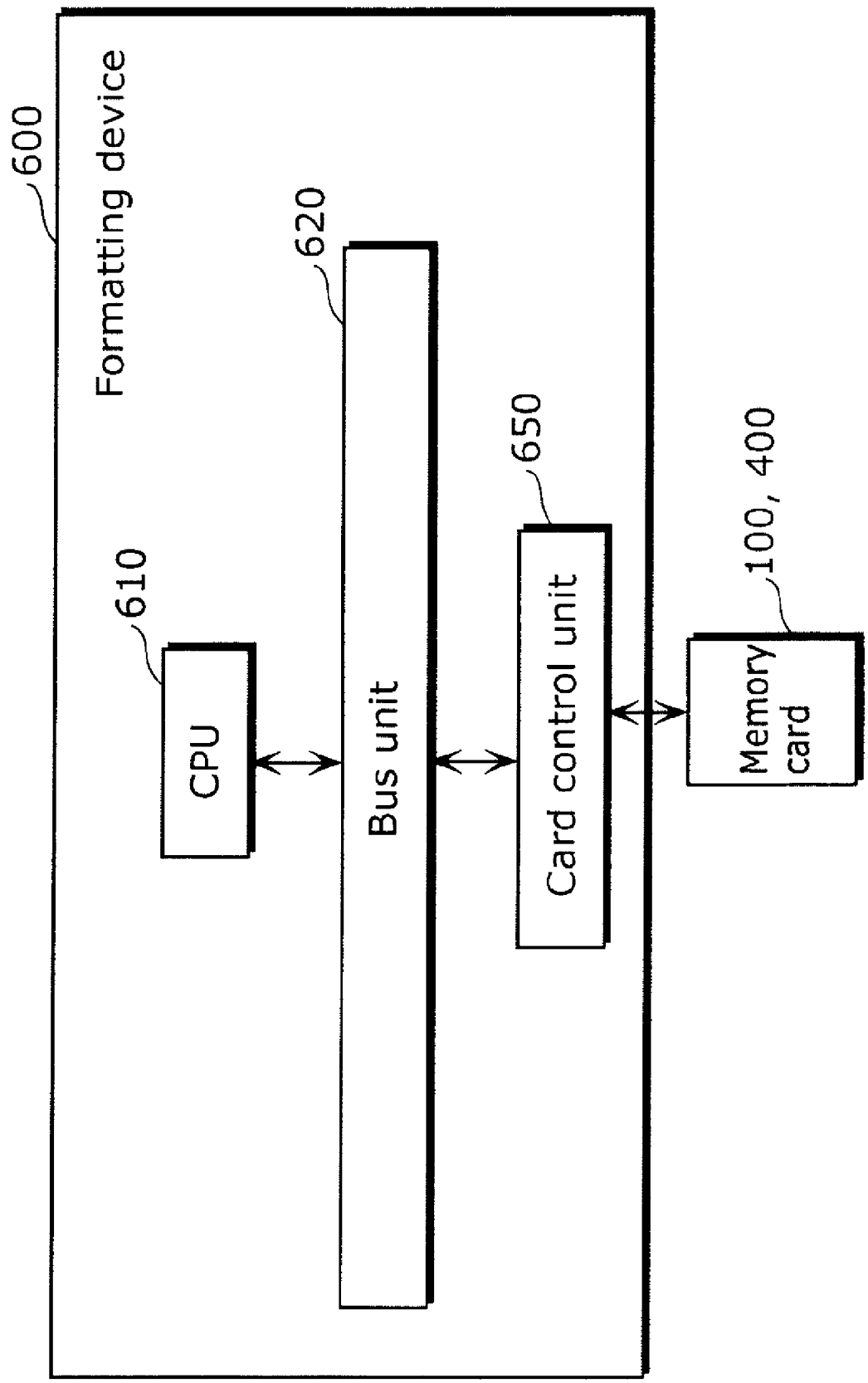
FIG. 7 shows an example of a hardware structure of a formatting device that performs a formatting method of the present invention.

FIG. 7 shows an example of a hardware structure of a formatting device that performs the formatting method of the present invention.

As shown in FIG. 7, a formatting device 600 includes a CPU 610, a bus unit 620, and a card control unit 650. The memory card 100 or 400 is inserted into the formatting device 600 as the target of the formatting process.

The formatting device 600 may be a general personal computer or a CPU processing system incorporated into an appliance such as a camera recorder. Although not shown, the CPU 610 includes a chip set, a memory, and a processing unit which stores a program for performing the formatting method of the present invention. That is to say, the CPU 610 executes a formatting execution program to implement the functions of all the constituent elements of the formatting device 200 according to Embodiment 1 or 2. Meanwhile, the CPU 610 executes other programs to implement other functions of the personal computer or the camera recorder, for example.

To put it differently, the formatting execution program is executed by the CPU 610, so that: a necessary parameter is obtained from the memory card 100 or 400 via the bus unit 620 and the card control unit 650; calculation related to the above-described formatting is performed; and the file management information, which is the result of the formatting, is written on the memory card 100 or 400. With this, even with use of an apparatus such as a personal computer, the memory cards 100 and 400 can be formatted according to the formatting method of the present invention.

In the present invention, it has been described that an advantageous effect lies basically in the point that the update of the file management information such as the directory entry information is not delayed because the management information of the file system (specifically, the file management information of the FAT file system) is placed in the first recording area. Such an advantageous effect is attributable to the characteristics of the first recording area of the memory card, which is the prerequisite of the present invention, that the processing time required for updating small data is short, as compared to the second recording area.

The present invention is not to be applied only to a memory card having such characteristics, but may also be applied to a memory card having other characteristics. It is to be noted that such characteristics are the physical characteristics based on the memory media used for the first recording area and the second recording area of the memory card, and the characteristics based on the memory control methods adopted for the first recording area and the second recording area. For example, the present invention can be applied to: a memory card having characteristics that the first recording area can be rewritten a greater number of times than the second recording area; a memory card having characteristics that a possibility of data error occurrence during recording or reproduction is lower in the first recording area is lower than in the second recording area; a memory card having characteristics that a possibility of data corruption caused by power discontinuity during recording is lower in the first recording area than in the second recording area; and so on.

Further, in the present invention, the file management information, which is highly-important information in the file system, is reliably placed in the first recording area, and thus the file management information is protected by making use of the characteristics of each recording area, thereby producing an appropriate advantageous effect.

Although Embodiments 1 and 2 have been described using the FAT file system as an example of the file system, the file system to be applied to the memory card is not limited to the FAT file system, and another file system such as a Universal Disk Format (UDF) may also be applied to the memory card. Even in such a case of applying another file system to the memory card, the advantageous effect of the present invention can be obtained by giving the memory card a format in which, when recording areas in the above-mentioned first recording area are to be allocated to plural directories, the recording areas are allocated to each directory at an appropriate ratio according to the application.

Moreover, although Embodiments 1 and 2 have shown that the formatting is performed on a memory card which is a card-type recording medium (memory module), it is not limited to a card-type recording medium. The formatting may be performed on a memory module of any shape.

Industrial Applicability

The formatting device and the formatting method according to the present invention can be used for formatting a recording medium such as a memory card.

The invention claimed is:

1. A formatting device which formats a memory module including a first recording area and a second recording area having different characteristics, the first recording area including recording areas, said formatting device comprising:
    a holding unit configured to hold a ratio of clusters of the recording areas of the first recording area to be allocated to each directory of directories that are to be created when the memory module is formatted; and
    an allocation unit configured to format the memory module by allocating, to each directory, a recording area, of the recording areas of the first recording area, having a size determined for the directory according to the ratio held by said holding unit,
    wherein, when each directory includes a first directory and a second directory that are different from each other, the ratio indicates a ratio between a size of a recording area, of the recording areas, which is to be allocated only to the first directory and a size of a recording area, of the recording areas, which is to be allocated only to the second directory.

2. The formatting device according to claim 1, wherein a time for updating data equal to or smaller than a predetermined size is shorter in the first recording area than in the second recording area.

3. The formatting device according to claim 1, wherein the first recording area can be rewritten a greater number of times than the second recording area.

4. The formatting device according to claim 1, wherein a possibility of error occurrence during recording or reproduction is lower in the first recording area than in the second recording area.

5. The formatting device according to claim 1, wherein a possibility of data corruption caused by power discontinuity during recording is lower in the first recording area than in the second recording area.

6. The formatting device according to claim 1, wherein said holding unit is configured to hold, as the ratio of the clusters of the recording areas to be allocated to each directory, a ratio of a number of files to be stored in each directory after being generated by a recording apparatus.

7. The formatting device according to claim 1,
    wherein said holding unit is configured to hold a plurality of ratios including the ratio, wherein said formatting device further comprises a selection unit configured to receive a user operation and select a ratio according to the received user operation from among the ratios held by said holding unit, and wherein said allocation unit is configured to allocate, to each directory, a recording area, of the recording areas, having the size determined for the directory according to the ratio selected by said selection unit.

8. The formatting device according to claim 1, wherein the first recording area is divided into predetermined area units, and wherein said allocation unit is configured to allocate, to each directory, the area units, a number of which is determined for the directory according to the ratio held by said holding unit.

9. The formatting device according to claim 1, wherein the directories include:
   a directory for storing an audio file; and
   a directory for storing a video file.

10. The formatting device according to claim 9, wherein the directories further include at least one of:
   a directory for storing a file showing a thumbnail or a still image corresponding to the video file;
   a directory for storing a moving picture file having a bit rate lower than a bit rate of the video file; and
   a directory for storing a file showing a setting or a situation when the video file or the audio file is generated.

11. A formatting method for formatting a memory module which includes a first recording area and a second recording area having different characteristics, the first recording area including recording areas, said formatting method comprising:
   holding a ratio of clusters of the recording areas of the first recording area to be allocated to each directory of directories that are to be created when the memory module is formatted; and
   formatting the memory module by allocating, to each directory, a recording area, of the recording areas of the first recording area, having a size determined for the directory according to the ratio held in said holding,
   wherein, when each directory includes a first directory and a second directory that are different from each other, the ratio indicates a ratio between a size of a recording area, of the recording areas, which is to be allocated only to the first directory and a size of a recording area, of the recording areas, which is to be allocated only to the second directory.

12. A non-transitory computer-readable recording medium having a program recorded thereon, the program for formatting a memory module which includes a first recording area and a second recording area having different characteristics, the first recording area including recording areas, the program causing a computer to execute a method comprising:
   holding a ratio of clusters of the recording areas of the first recording area to be allocated to each directory of directories that are to be created when the memory module is formatted; and
   formatting the memory module by allocating, to each directory, a recording area, of the recording areas of he first recording area, having a size determined for the directory according to the ratio held in said holding,
   wherein, when each directory includes a first directory and a second directory that are different from each other, the ratio indicates a ratio between a size of a recording area, of the recording areas, which is to be allocated only to the first directory and a size of a recording area, of the recording areas, which is to be allocated only to the second directory.

* * * * *